(12) United States Patent
Perrin (10) Patent No.: US 12,282,468 B2
(45) Date of Patent: Apr. 22, 2025

(54) DYNAMIC DATA QUERY ROUTING FOR MANAGING ACCESS TO DATASETS HAVING MULTIPLE VERSIONS

(71) Applicant: PAYPAL, INC., San Jose, CA (US)

(72) Inventor: Jean-Georges Perrin, New Lebanon, NY (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/170,842

(22) Filed: Feb. 17, 2023

(65) Prior Publication Data
US 2024/0281423 A1    Aug. 22, 2024

(51) Int. Cl.
G06F 16/21         (2019.01)
G06F 16/2453       (2019.01)

(52) U.S. Cl.
CPC ........ *G06F 16/219* (2019.01); *G06F 16/2453* (2019.01)

(58) Field of Classification Search
CPC ..................................................... G06F 16/219
USPC ......................................................... 707/770
See application file for complete search history.

(56) References Cited

U.S. PATENT DOCUMENTS

| | | | | |
|---|---|---|---|---|
| 10,503,700 B1* | 12/2019 | Sanvido | ............... | G06F 16/9535 |
| 10,656,865 B1* | 5/2020 | Janse van Rensburg | ..................... | G06F 3/061 |
| 10,846,284 B1* | 11/2020 | Park | ...................... | G06F 16/283 |

FOREIGN PATENT DOCUMENTS

CN         116569161 A  *  8/2023  ........... G06F 16/219

* cited by examiner

*Primary Examiner* — Syling Yen
(74) *Attorney, Agent, or Firm* — Haynes and Boone, LLP (57) ABSTRACT

There are provided systems and methods for dynamic data query routing for managing access to datasets having multiple versions. A service provider, such as an electronic transaction processor for digital transactions, may provide data for different applications including local device-side software applications and web-based or server-side applications. The data may be read and provided within the application, for example, for output or processing, as well as operated on in the applications to update, add to, or delete from corresponding records. When retrieving or loading data, a data quantum may be used in a data mesh to abstract database physical locations and utilize logical names that allow for applications to code and query for data without direct entanglement with databases and corresponding stored datasets for the data. A router may then be used to route requests and queries for the data to optimized databases for the data.

20 Claims, 7 Drawing Sheets

DYNAMIC DATA QUERY ROUTING FOR MANAGING ACCESS TO DATASETS HAVING MULTIPLE VERSIONS

TECHNICAL FIELD

The present application generally relates to software application consumption of data from disparate datasets having multiple versions, and more particularly to managing queries for a data quantum in a data mesh.

BACKGROUND

Online service providers may offer various services to end users, merchants, and other entities. This may include providing electronic transaction processing data flows, services, and other computing resources. Further, the service provider may provide and/or facilitate the use of online merchant marketplaces and/or transaction processing between different entities. When providing these computing services, the service provider may utilize software applications, websites, decision services and microservices, intelligent compute services and models, and the like that consume data and process data requests and loads for different outputs (e.g., authentication, risk or fraud analysis, electronic transaction processing, account services, data queries and results, etc.). On receiving a request, a computing service may begin executing a set of tasks based on loaded data from a database or other resource. Each of these data loads may require data from a dataset, which may require computing resources to identify a corresponding database storing the dataset. However, the dataset may be stored in multiple databases and have multiple versions, which may be unknown by or not properly coded in direct or strictly coupled application functionalities and operations to datasets and corresponding versions, which can increase processing time and/or lead to inaccurate outputs. As such, it is desirable to determine and route data queries to proper datasets with databases having current, compatible, and/or operationally required versions while maintaining data consistency and atomicity (e.g., updates or changes are all performed/succeed or fail together) between different and disparate database systems.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for dynamic data query routing for managing access to datasets having multiple versions. Systems suitable for practicing methods of the present disclosure are also provided.

A service provider may provide different computing resources and services to users through different websites, software applications (e.g., which may reside locally on a computing device and/or web applications accessible via a website), and/or other online platforms and resources. When a user is utilizing the services of a particular service provider, the service provider may provide computing services that consume data from different data sources and stores, such as to display the data to the user and/or perform operations on or using the data. For example, an online transaction processor may provide services associated with electronic transaction processing, including account services, user authentication and verification, digital payments, risk analysis and compliance, and the like. Different applications, microservices, and the like may be used to determine if, when, and how a particular computing service may be provided to users, as well as what data may be consumed, output, and/or utilized by such services. For example, risk rules may be utilized with a risk engine for a decision service to determine, based on past and/or current transaction data from a transaction, data source, and the like, if an indication of fraud is present in a digital transaction and payment. In turn, this may be used to determine whether to proceed with processing the transaction or decline the transaction (as well as additional operations, such as request further authentication and/or information for better risk analysis). After transaction processing, a database record may also be written or updated based on the outcome of the transaction processing For example, a user may utilize online service providers, such as transaction processors, via their available online and networked digital platforms and corresponding computing services. The user may engage in operations to view data (e.g., in an analytical data consumption mode) and/or operate on data (e.g., in an operational/transactional data consumption mode) from different datasets, which may be spread out over disparate databases and may have different versions each stored in different databases. For example, a user may pay for one or more transactions using a digital wallet or other account with an online service provider or transaction processor (e.g., PayPal®). An account may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The account and/or digital wallet may be loaded with funds or funds may otherwise be added to the account or digital wallet. The application or website of the service provider, such as PayPal® or other online payment provider, may provide payments and the other transaction processing services via the account and/or digital wallet. Each of these operations may consume, for viewing and/or use/change, data during execution.

The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and other transaction processing services. In further embodiments, the service provider and/or other service providers may also provide additional computing services, including social networking, microblogging, media sharing, messaging, business and consumer platforms, etc. These computing services may be deployed across multiple different websites and applications for different operating systems and/or device types. Furthermore, these computing services may utilize the decision services when determining decisions during data processing, which consume data for viewing and use. For example, access and use of these accounts may require data from different datasets, where each dataset may have multiple versions. Similarly, internal users, such as company employees, agents, administrators, and the like, may utilize the service provider's platforms and services via employee accounts and the like. Conventionally, applications and their operations may be strictly linked to particular datasets and/or versions of datasets, which causes complexity during alignment between different databases and development teams working on applications, datasets, and computing services.

In this regard, when utilizing data by internal and/or external users, different applications, computes, processors, application programming interfaces (APIs), and/or application operations may be invoked, and data may be queried for viewing and/or use. This may include use of a client device request processor, a compute for business rules, a data loader, a validation of a data load of the data processing request, a user authenticator, or a response builder for a decision by the decision service, although other tasks may also be invoked. Further, internal teams may view and/or operate on data from different datasets when updating data and/or providing computing services to customers and other end users. In this regard, computing tasks may provide a result based on a provided data load for a data processing request, where the data load may include data from one or more databases found in a version of a dataset. Data may be stored in datasets, which may correspond to data tables and other formats of data having data records or the like. For example, a data table may include rows for data records and columns corresponding to a measured, recorded, and/or determined parameter or attribute of the data record. Datasets may also have different versions, such as a first, second, third, etc. (e.g., v1, v2, v3, etc.) version of the dataset based on updates or changes to the dataset and/or corresponding data records and data attributes. For example, changes may be performed by updating a format, compatibility, location, or the like of the dataset, as well as adding new data records, removing old data records, updating data attributes for data records, and/or changing a data attribute such as adding or deleting a column or changing a column's recorded data measurement (e.g., inches to centimeters, etc.). Each version may be identified by a version identifier, including unique version numbers that may be sequential or otherwise ordered. Further, each dataset and/or version of a data set may be stored and/or distributed for storage over one or multiple devices. For example, a dataset may have a v1 (first version) that is stored by database A, while v2 (second version) is stored by databases B and C. The same database may store different versions of a dataset and/or portions of a version of the dataset (e.g., in the aforementioned example, database A may store all of v2 or a portion of v2 with database B in other embodiments).

Applications and users utilizing such applications may consume and utilize this data from different datasets. Internal and/or external applications, APIs, decision services, and the like may request and/or process data loads, as well as operate on data that is then updated and/or stored in databases having their corresponding version of that dataset. In this regard, an application or other executable module may include different data processing operations and/or services including APIs that may interact with other computing services and/or databases to send and receive API calls for data query, retrieval, and/or usage. These operations may include executable instructions to perform one or more computing tasks that process data from datasets and corresponding databases. For example, computing tasks may correspond to executable code, operations, and/or models that may operate on data processing requests from a client computing device, such as an end user or customer of the service provider system. In some embodiments, a data processing request may be associated with a particular request for use of a service for account login, authentication, electronic transaction processing, risk or fraud, and other ones of the aforementioned computing services. In some environments and/or conditions, multiple applications, computing platforms, decision services, and the like may utilize the same data load, such as an account balance, account login name, contact identifier, user input for the data request, profile or transaction history, or the like. For example, a computing architecture may have different applications, processing nodes, and/or flows that utilizes data for output and/or operations, which may require the same or similar data from datasets and corresponding databases. For example, for a first computing service, there may be a gateway where a "username" or a "balance" is required. Thereafter, there may be other computing services needing a "profile, transaction history, and balance", and further a risk decision service needing a "balance, and transaction history". However, conventionally each application or the like may be directly linked and coupled, such as through computing code and dependencies in such code, to particular datasets and/or databases. This may not provide current, appropriate, or optimized data during execution, and may also cause inconsistency and lack of atomicity when operating on data between different versions of datasets and/or databases storing those versions.

To address these problems, in one or more embodiments, a data quantum paradigm may be determined for a data mesh encapsulating or including disparate databases and other data stores storing multiple versions of a dataset. For example, a data quantum paradigm may correspond to a data mesh or environment where the applications, client devices, databases, and other components within a data mesh are capable and all affect and change each corresponding component, and therefore the data quantum paradigm acts as the data store englobing other physical databases and data stores in the data mesh. The data quantum paradigm allows for the physical databases in the data mesh to be included in a single paradigm, which allows for identification of the paradigm instead of individual physical and/or digital locations (e.g., digital addresses) for databases. Databases, as well as corresponding datasets, may be identified by logical names instead of direct physical and/or digital names and addresses. In this regard, the data mesh may be established with identified and/or selected databases, as well as corresponding datasets and versions of those datasets stored by each database. The data mesh for the data quantum may therefore encapsulate the set of databases and their corresponding versions of datasets as identified and selected databases and data stores. While the data quantum may identify each dataset's location, the data quantum may more loosely link or couple to particular versions and databases through logical identifiers in place of specific physical identifiers and/or digital addresses. This allows for abstracting where physical data resides and is available to the data mesh over one or more networks.

In this regard, a data request or query router may be provided for the data quantum to route or otherwise transmit data queries and requests from client devices to particular databases in the corresponding data mesh. The data request router may correspond to a computing device, a software application and/or operation, and/or a computing component on a network that facilitates interactions for data from client devices. These interactions may correspond to requests to retrieve and consume data from applications on client devices, which may include analytical operations to read and/or present data, as well as operational or transactional operations to operate and change, update, add, or delete data. The router may correspond to a component of the data quantum and may be identified by the data quantum's identifier, including a logical name or identifier for the data quantum that may be used in queries, calls, and the like.

The router corresponding to the data quantum may include a data table that allows for routing of queries and other data requests, including representational state transfer (REST) API calls that are structured to identify the data quantum for the request routing using the router. The router allows the data quantum and interacting software applications to loosely couple to data as the consumer of the data without requiring direct or physical addresses and names for the dataset and databases. This does not require direct entanglement with databases and datasets by applications and other executable operations, and instead allows for code for these applications and operations to identify the data quantum and a logical name for the dataset and/or dataset's version when requesting data for viewing and/or operation, as well as other API calls using the data. The data table includes data records and other information for datasets, where each dataset is identified by a logical name, version, status, user consumption mode (e.g., analytical or operational), physical database address(es) or name(s) (where one or more databases may store the dataset's version), and additional information. Thus, when a call using the data quantum and logical name for a dataset is received by the data router, the table may be utilized to identify corresponding datasets for data retrieval. The table of the router therefore allows for abstracting of the database's or store's physical name by a logical name recognized by the application, which allows more loose coupling to other datastores and datasets.

Thus, when applications or other operations request data, such as for output and analytical operations or for processing and transactional operations, code for such executable software may format and execute a call to the data quantum, which may be received, intercepted, and/or detected by the data quantum's router. For example, a REST API call may be structured to have an hypertext transfer protocol (HTTP) verb or the like (e.g., an action to perform on the resource), a protocol, a name of the data quantum (which allows for identification of the data mesh and corresponding router, a version for a dataset (which may include version number and/or other identifier including current, beta versions, etc.), and/or a logical name of a resource (e.g., the database and/or dataset from multiple databases). The router may receive the call and request and may route the request and/or execute a call to request the data from one or more corresponding databases for a version of the dataset.

Translation between the logical name to the physical name of the database/store for the dataset's version may be performed by the data quantum's router using the table of datasets, parameters, and corresponding logical names of the databases and their actual identifiers or physical names. However, the router may determine a most correct or useful version of the dataset for the requested data and return the data from that dataset. For example, the router may determine to route a data request or query to a most current version instead of an identified version depending on application requirements and/or capabilities or may route to the specified version or another version based on capabilities. Thus, routing on the data mesh may be based on compatibility, new data, data formats, error or breaking of data sets, and the like. However, the router may provide direct access to data in the data mesh for the data quantum paradigm englobing the disparate data stores. This further allows for applications to consume data in both operational and analytical modes in a data mesh. However, the router may have different data ports for operational or analytical requests, which may be incorporated in the same or connected components for the data quantum.

In some embodiments, the data router may also or instead provide a list of all or a subset of compatible data sets, versions, and/or databases with status for the application instead of reading the data from the table and dynamically determining and routing data queries. Thereafter data may be returned to the requesting client. The data client may also operate on data and the data quantum may provide for consistency and atomicity of data between the versions and databases. For example, the router and/or another computing component of the data quantum may update all versions based on data operations if the data that is affected is present in that version for the dataset.

Thus, the data quantum and router allow for operating on abstract databases that is then proliferated throughout the appropriate networks and/or systems and consistency is maintained. Further, by abstracting the physical names of databases to logical names used by the data quantum to englobe the databases into a data mesh, the data quantum allows coders and corresponding applications and/or executable operations and code to loosely link or couple to data and allow requested data to be dynamically returned from different datasets. This provides more robust data request systems while automatically returning the correct or desired data for application processing. This provides more efficient and coordinated data translations, formatting between different requests and/or API call structures, and data transmissions.

Figure 1:
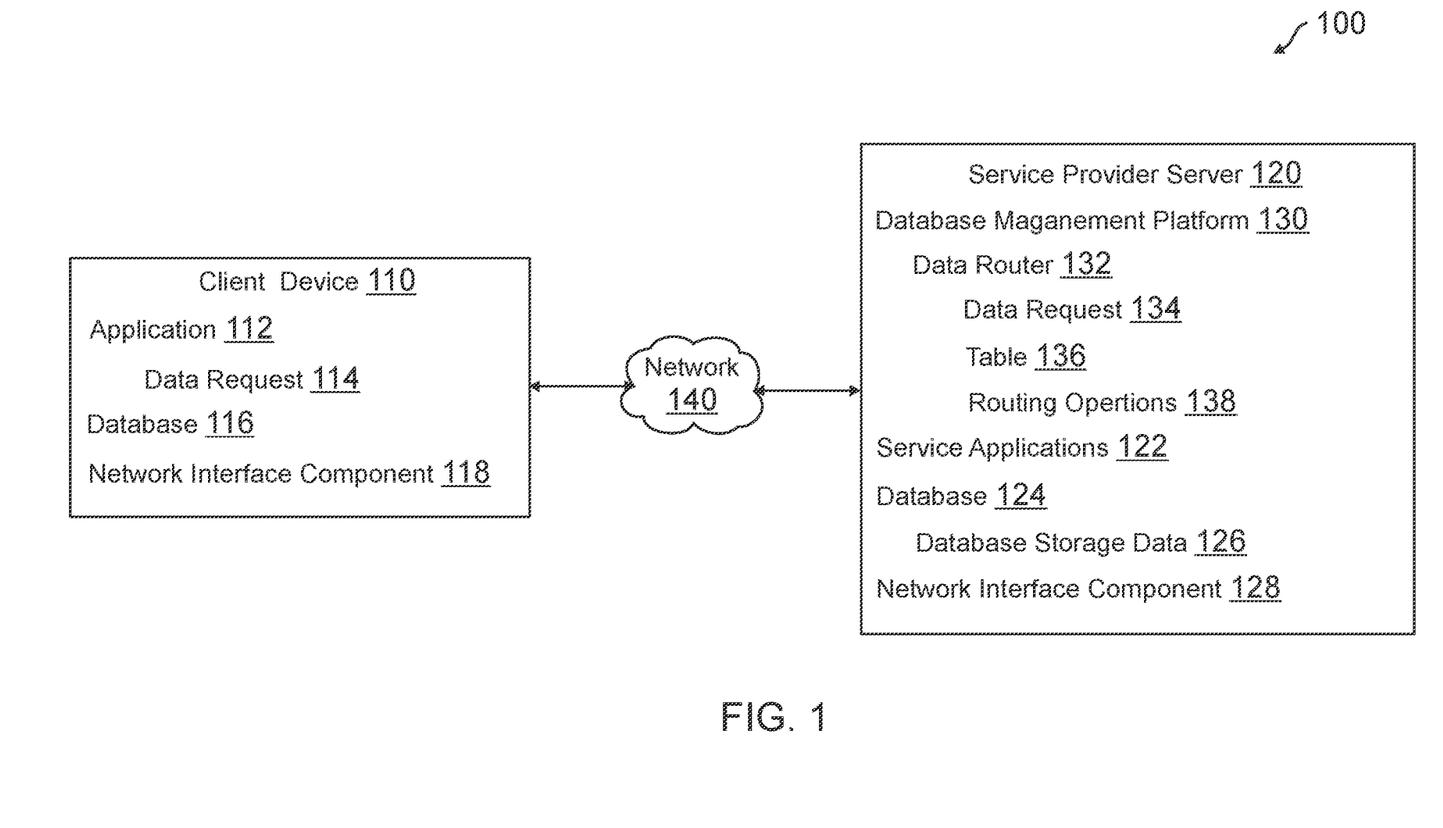
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG.

1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a client device 110 and a service provider server 120 in communication over a network 140. Client device 110 may be utilized by a user to access a computing service or resource provided by service provider server 120, where service provider server 120 may provide various data, operations, and other functions to client device 110 via network 140. These computing services may utilize data from a data mesh of databases, which may include multiple and disparate databases residing in physical locations and/or having physical names. In this regard, client device 110 may be used to access a website, application, or other platform that provides computing services and request data, which may be loaded to an application and/or operated on by the application. Service provider server 120 may provide a data quantum paradigm to provide a data request router that routes requests and/or queries for data in the data mesh to versions of datasets stored by different databases. Routing by service provider server 120 may be based on parameters for the request and/or datasets in order to provide more efficient, optimized, and/or faster data retrieval and loading, as well as consistency during database updates and operations to manipulate stored data for versions of datasets.

Client device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be implemented as a communication device that may utilize appropriate hardware and software configured for wired and/or wireless communication with service provider server 120. For example, in one embodiment, client device 110 may be implemented as a personal computer (PC), a smart phone, laptop/tablet computer, wristwatch with appropriate computer hardware resources, eyeglasses with appropriate computer hardware (e.g., GOOGLE GLASS® and/or other headsets including metaverse configured headsets), other type of wearable computing device, implantable communication devices, and/or other types of computing devices capable of transmitting and/or receiving data. Although only one device is shown, a plurality of devices may function similarly and/or be connected to provide the functionalities described herein.

Client device 110 of FIG. 1 contains an application 112, a database 116, and a network interface component 118. Application 112 may correspond to executable processes, procedures, and/or applications with associated hardware. In other embodiments, client device 110 may include additional or different modules having specialized hardware and/or software as required.

Application 112 may correspond to one or more processes to execute software modules and associated components of client device 110 to provide features, services, and other operations for a user over network 140, which may include accessing and utilizing computing services provided by service provider server 120 and/or requesting data from service provider server 120. In this regard, application 112 may correspond to specialized software utilized by a user of client device 110 that may be used to access a website or application (e.g., mobile application, rich Internet application, or resident software application) that may display one or more user interfaces that allow for interaction with the computing services of service provider server 120, display of data from service provider server 120, and/or processing of or operations on such data. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 140, including retrieving website information, presenting the website information to the user, and/or communicating information to the website. However, in other embodiments, application 112 may include a dedicated application of service provider server 120 or other entity.

Application 112 may be associated with account information, user financial information, and/or transaction histories. However, in further embodiments, different computing services may be provided via application 112, including social networking, media posting or sharing, microblogging, data browsing and searching, online shopping, and other services available through service provider server 120. Thus, application 112 may also correspond to different service applications and the like. When utilizing application 112 with service provider server 120, application 112 may request processing of a data request 114, such as by identifying data requests for viewing, use, and/or operation on in application 112 from one or more databases storing versions of a dataset having the data. Data request 114 may correspond to an operation to request, retrieve, and use data, such as a request to perform a database operation and/or database transaction that utilizes stored data to a dataset. In some embodiments, data request 114 may also be associated with another operation performed via application 112, such as an account login, authentication, electronic transaction processing, and/or use of other services described herein. Data request 114 may identify data for retrieval by service provider server 120 to provide in application 112 for a resulting output. As such, application 112 may be used with a router and data mesh for a data quantum that allows for identification of data in a dataset by a logical name of the dataset and/or database in place of physical, real, or digital addresses or names for the data, thereby providing a looser coupling that allows for data retrieval from other sources. Application 112 may therefore include operations to structure API calls and the like to identify the data quantum, as well as the dataset and/or database by a logical name established with the data quantum for requesting and/or querying for corresponding data.

In various embodiments, client device 110 includes other applications as may be desired in particular embodiments to provide features to client device 110. For example, the other applications may include security applications for implementing client-side security features, programmatic client applications for interfacing with appropriate application programming interfaces (APIs) over network 140, or other types of applications. The other applications may also include email, texting, voice and IM applications that allow a user to send and receive emails, calls, texts, and other notifications through network 140. In various embodiments, the other applications may include financial applications, such as banking applications. Other applications may include social networking applications, media viewing, and/or merchant applications.

The other applications may also include other location detection applications, which may be used to determine a location for the user, such as a mapping, compass, and/or GPS application, which can include a specialized GPS receiver that determines location information for client device 110. The other applications may include device interface applications and other display modules that may receive input from the user and/or output information to the user. For example, the other applications may contain software programs, executable by a processor, including a graphical user interface (GUI) configured to provide an interface to the user. The other applications may therefore use devices of client device 110, such as display devices capable of displaying information to users and other output devices, including speakers.

Client device 110 may further include database 116 stored on a transitory and/or non-transitory memory of client device 110, which may store various applications and data and be utilized during execution of various modules of client device 110. Database 116 may include, for example, identifiers such as operating system registry entries, cookies associated with application 112 and/or the other applications, identifiers associated with hardware of client device 110, or other appropriate identifiers, such as identifiers used for payment/user/device authentication or identification, which may be communicated as identifying the user/client device 110 to service provider server 120. Moreover, database 116 may include data used for data request 114, such as identifiers, API call structures and/or names used when querying data, and the like from the data quantum provided and/or managed by service provider server 120 for a corresponding data mesh of databases.

Client device 110 includes at least one network interface component 118 adapted to communicate with service provider server 120 and/or other devices and servers over network 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide computing services and systems to provide responses, output, results, and/or other data to client device 110 and other devices and servers, including routing and providing data from databases in a data mesh using a data quantum. In this regard, service provider server 120 includes one or more processing applications which may be configured to interact with client device 110 and/or other devices and servers. For example, service provider server 120 may deploy a data quantum that routes data requests and queries in order to optimize data retrieval, loading, and changes with databases. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes a dataset management platform 130, service applications 122, a database 124, and a network interface component 128. Dataset management platform 130 and service applications 122 may correspond to executable processes, procedures, and/or applications with associated hardware. In other embodiments, service provider server 120 may include additional or different modules having specialized hardware and/or software as required.

Dataset management platform 130 may correspond to one or more processes to execute modules and associated specialized hardware of service provider server 120 to manage, retrieve, and/or operate on data that may be used by and/or with client device 110 and/or service provider server 120, such as data for account usage, digital electronic communications, electronic transaction processing, and the like. In this regard, dataset management platform 130 may correspond to specialized hardware and/or software used by a user associated with client device 110 to interact with client device 110 and/or one or more computing services through service applications 122, which in turn utilize data from database within a data mesh. Service applications 122 may include and/or utilize various applications, such as those that may correspond to electronic transaction processing, payment accounts, payment messaging, and the like for electronic transaction processing. Alternatively or in addition, service applications 122 may include social networking, media posting or sharing, microblogging, data browsing and searching, online shopping, and other services available through service provider server 120.

In this regard, various operations including user interface display, computing application usage for account services, account setup, authentication, electronic transaction processing, and other computing services, and other operations of service applications 122 may utilize data managed by dataset management platform 130. For example, various computing tasks of service provider server 120 and/or client device 110 may require data found in one or more versions of a dataset stored by one or more databases. Dataset management platform 130 may utilize data router 132 to intercept, route, process, and/or otherwise interact with data requests 134 requesting data for processing, viewing, use in, and/or operation on such data in an application, such as application 112 on client device 110 in response to data request 114. Data router 132 may correspond to a data quantum, such as a deployable element for a data mesh that includes, as data sources, the set of databases having versions of stored datasets. The data quantum may correspond to the data mesh that links the data sources (e.g., disparate databases storing different versions of one or more datasets) for data with controls, client devices, and the like in a single domain. The data quantum then may be identified by the domain to allow for data retrieval from datasets in the data mesh. Data router 132 may determine, based on data requests 134 and table 136, where queries for data should be routed in order to respond to data requests 134, for example, to provide data in return to client device 110 for data request 114. Thus, data router 132 may determine routing operations 138 for data requests 134 to route those requests to proper (e.g., most optimized, efficient, current, or fastest) databases for data retrieval and/or operation on in a version of a dataset. Data router 132 may also coordinate compliance, consistency, and/or atomicity of data changes, updates, additions, or deletions in one or more new, current, old, or expired versions of datasets.

Data router 132 may perform routing operations 138 of data requests 134 using table 136 to route those requests and/or queries to specific databases and/or versions of datasets. Table 136 may correspond to a data table or other data representation that includes information identifying datasets for data (e.g., by name or the like) and their corresponding databases (e.g., by logical name or identifier).

Table 136 may include additional information including the aforementioned logical names recognized by the application requesting the data, a data consumption mode enabled for the dataset, a dataset version, a dataset status, and the like. Thus, table 136 may be used for translation of the logical names or identifiers of datasets to physical or digital names, addresses, or identifiers of databases for the datasets, which may be used to locate and query the databases for a stored version of that dataset.

Using table 136 with the parameters for data requests 134, data router 132 may determine and perform routing operations 138 of those requests and corresponding queries for data to databases and corresponding versions of datasets to optimize data retrieval. This may include optimization for a most current or currently available version of a dataset having the data, an efficient or low resource cost/usage retrieval, a fastest retrieval, or the like. Further, data router 132 may allow for routing of both analytical and operational requests and API calls associated with data from datasets, such as to read data or perform operations on data.

In some embodiments, determination of a version of a dataset and/or database for routing operations 138 may be performed based on rules and/or availabilities of datasets, including rules regarding current or other version usage, application requirements, application compatibility with dataset and/or data format, database configuration and query structure, data latency and/or bandwidth (e.g., service level agreement (SLA) requirements and maximum or threshold time requirements), data loads and/or processing loads for data retrieval and/or operations, and the like. The determination by data router 132 of routing operations 138 to route or direct data requests 134 including data request 114 from client device 110 may have strict requirements to a particular version of data. However, less strict requirements may allow for data router 132 to configure routing operations 138 to different versions of a dataset for data retrieval, which may be stored by the same or different databases of the data mesh. These requirements may be data and/or application specific and may be based on rule-based models and engines, as well as intelligent decision models and systems.

For example, machine learning (ML) models and other artificial intelligence (AI)-based systems and engines may be used for routing operations 138. Machine learning engines may include AI models, such as ML or neural network (NN) models. AI models may generally correspond to any artificial intelligence that performs decision-making, such as rules-based engines and the like. However, AI models may also include subcategories, including ML models and NN models that instead provide intelligent decision-making using algorithmic relationships. Generally, NN may include deep learning models and the like, and may correspond to a subset of ML models that attempt to mimic human thinking by utilizing an assortment of different algorithms to model data through different graphs of neurons, where neurons include nodes of data representations based on the algorithms that may be interconnected with different nodes. ML models may similarly utilize one or more of these mathematical models, and similarly generate layers and connected nodes between layers in a similar manner to neurons of NN models.

When building ML models, training data may be used to generate one or more classifiers and provide recommendations, predictions, or other outputs based on those classifications and an ML model. The training data may be used to determine input features for training predictive scores for a "best" or preferred dataset (e.g., based on versioning, update times, etc.), average or predicted data loading times, data loading requirements, data loading resource usage, data storage resource consumption and/or cost, and the like, which may be used to generate an output decision of a version of a dataset and/or database to query for the requested data (e.g., from data request 114). For example, ML models may include one or more layers, including an input layer, a hidden layer, and an output layer having one or more nodes, however, different layers may also be utilized. For example, as many hidden layers as necessary or appropriate may be utilized. Each node within a layer is connected to a node within an adjacent layer, where a set of input values may be used to generate one or more output scores or classifications. Within the input layer, each node may correspond to a distinct attribute or input data type that is used to train ML models.

Thereafter, the hidden layer may be trained with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for the ML models that attempt to classify or identify a dataset for data retrieval that is most optimized, efficient, and/or fastest for each of data requests 134. ML models may be trained by using training data associated. By providing training data to train ML models, the nodes in the hidden layer may be trained (adjusted) such that an optimal output (e.g., a classification) is produced in the output layer based on the training data. By continuously providing different sets of training data and penalizing ML models when the output of ML models is incorrect, ML models (and specifically, the representations of the nodes in the hidden layer) may be trained (adjusted) to improve its performance in data classification. Adjusting ML models may include adjusting the weights associated with each node in the hidden layer. Thus, when ML models are used to perform a predictive analysis and output, the input may provide a corresponding output based on the classifications trained for ML models.

Service applications 122 may correspond to one or more processes to execute modules and associated specialized hardware of service provider server 120 to process a transaction or provide another service to customers, merchants, and/or other end users and entities of service provider server 120. In this regard, service applications 122 may correspond to specialized hardware and/or software used by service provider server 120 to provide computing services to users, which may include electronic transaction processing and/or other computing services using accounts provided by service provider server 120. In some embodiments, service applications 122 may be used by users associated with client devices 110 to establish user and/or payment accounts, as well as digital wallets, which may be used to process transactions. In various embodiments, financial information may be stored with the accounts, such as account/card numbers and information that may enable payments, transfers, withdrawals, and/or deposits of funds. Digital tokens for the accounts/wallets may be used to send and process payments, for example, through one or more interfaces provided by service provider server 120. The digital accounts may be accessed and/or used through one or more instances of a web browser application and/or dedicated software application executed by client devices 110 and engage in computing services provided by service applications 122. Computing services of service applications 122 may also or instead correspond to messaging, social networking, media posting or sharing, microblogging, data browsing and searching, online shopping, and other services available through service provider server 120. Service applications 122 may therefore be used to request, view, process, and/or operate on data by client device 110, which may utilize dataset management platform 130 for data request routing and/or querying using a data quantum.

In various embodiments, service applications 122 may be desired in particular embodiments to provide features to service provider server 120. For example, service applications 122 may include security applications for implementing server-side security features, programmatic client applications for interfacing with appropriate application programming interfaces (APIs) over network 140, or other types of applications. Service applications 122 may contain software programs, executable by a processor, including a graphical user interface (GUI), configured to provide an interface to the user when accessing service provider server 120 via one or more of client devices 110, where the user or other users may interact with the GUI to view and communicate information more easily. In various embodiments, service applications 122 may include additional connection and/or communication applications, which may be utilized to communicate information to over network 140.

Additionally, service provider server 120 includes database 124. Database 124 may store various identifiers associated with client device 110. Database 124 may also store account data, including payment instruments and authentication credentials, as well as transaction processing histories and data for processed transactions. Database 124 may store financial information and tokenization data. Database 124 may further store data associated with a data mesh and/or data quantum, including data for table 136 utilized by data router 132. In various embodiments, the data for table 136 may include, be derived or determined from, and/or updated by database storage data 126. In this regard, database storage data 126 may include information, physical, real, or digital addresses and/or names, and other identifiers, as well as corresponding logical names or identifiers for translation between physical and logical names by data router 132. Database storage data 126 may also or further include information for databases in the data mesh, as well as corresponding versions of datasets stored by those databases, including versioning information, compatibility, status, update or version date and time information available data consumption modes (e.g., user or application consumption, such as analytical or operational), and the like.

In various embodiments, service provider server 120 includes at least one network interface component 128 adapted to communicate client device 110 and/or other devices and servers over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
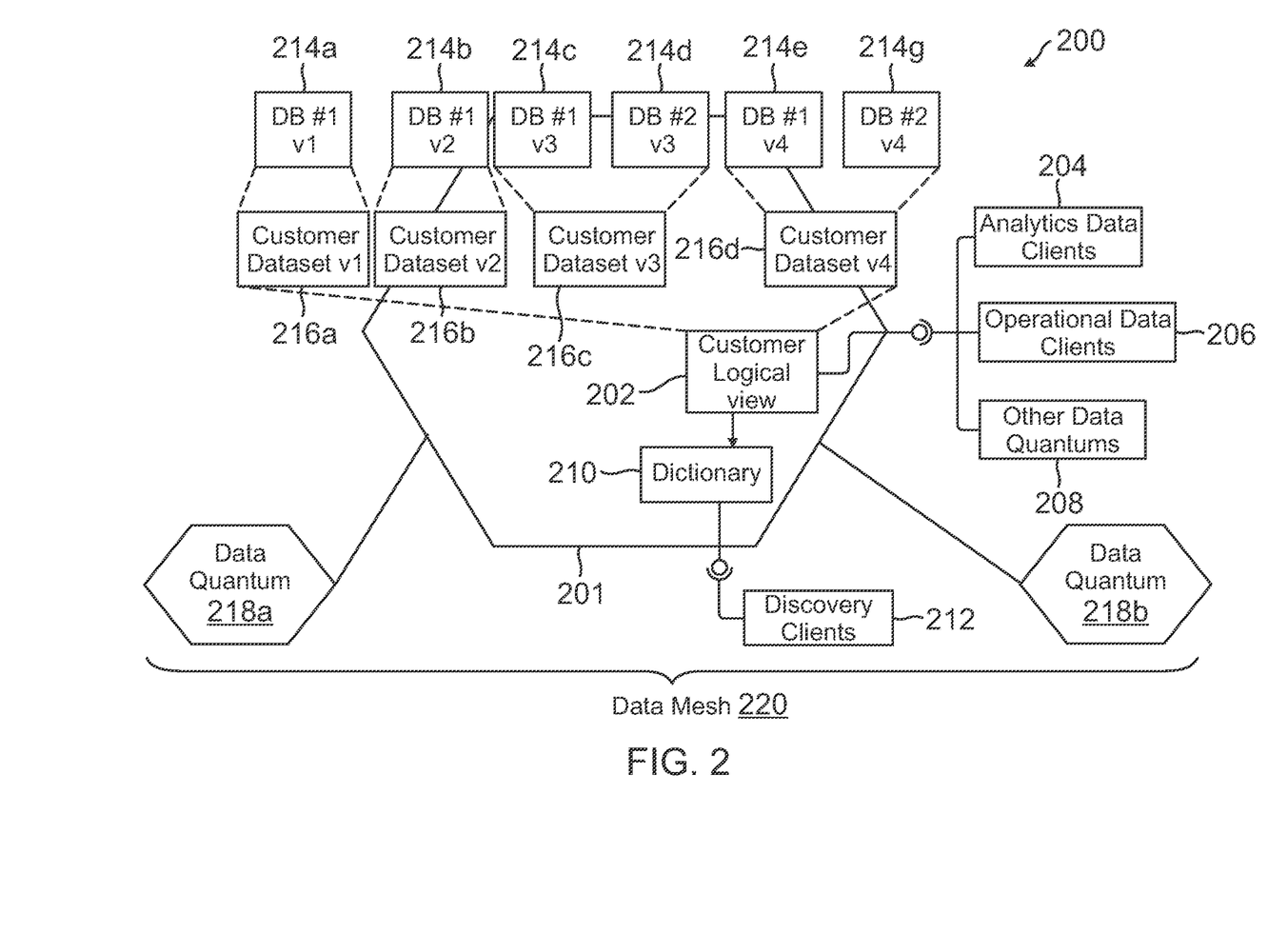
FIG. 2 is an exemplary system environment where different client devices performing different data consumption modes may request and/or operate on data from different datasets and disparate databases, according to various embodiments, according to an embodiment.

FIG. 2 is an exemplary system environment 200 where different client devices performing different data consumption modes may request and/or operate on data from different datasets and disparate databases, according to various embodiments. System environment 200 of FIG. 2 includes a customer logical view 202 for a data quantum 201 of a data mesh 220 that allows for connecting and routing queries for databases using a data request or query router, such as data router 132 with dataset management platform 130 discussed in reference to system 100 of FIG. 1. A data quantum, such as data quantum 201, may correspond to a deployable element in a data architecture for data mesh 220. Data quantum 201 may correspond to a particular domain for data that is designated for data quantum 201, such as a particular type of data, computing service from which the data originates or where the data is used, and the like. Data quantum 201 and other data quanta may include data and data assets (e.g., databases, datasets and versions thereof, and the like) for a particular domain, and may further include subcomponents for APIs and computing services used to read, write, update, delete, or otherwise interact with data and data records in versions of datasets.

Data mesh 220 may correspond to a decentralized data architecture composed of individual data quanta that allows for organization of data for the data mesh into domains designated by each data quanta, such as sales, marketing or advertisement, risk, transaction processing, customer relationship management, and the like for an online transaction processor. In this regard, data mesh 220 may be composed on one or more data quanta, including data quantum 201, as well as a data quantum 218a and a data quantum 218b. Each of data quantum 201, data quantum 218a, and data quantum 218b may have a corresponding domain that is linked together in data mesh 220. In system environment 200, analytical data clients 204 and operational data clients 206, which may correspond to one or more devices similar to client device 110 discussed in reference to system 100, may connect with customer logical view 202 for data request routing, as well as other data quantums 208 that may form data mesh 220.

In system environment 200, analytical data clients 204 and operational data clients 206 initially requests data and/or performs a computing operation or data processing that loads, utilizes, and/or operates on data requested from a service provider and requires an action from a service provider. An API call for the data may be structured for data quantum 201 in system environment 200, which may be invoked in order to process a data request and provide resulting data and operations from data quantum 201 in data mesh 220 of disparate databases and stored versions of datasets. In this regard, analytical data clients 204, operational data clients 206, and/or other data quantums 208 may interact with customer logical view via these API calls, which may be structured to include identification of data quantum 201 in system environment 200 and further include logical names, views, and the like of corresponding resources linked and/or englobed by data quantum 201. A dictionary 210 may be used to allow for discovery clients 212, such as other data quantum users, to connect with, including without authentication, to data quantum 201. Discovery clients 212 may interact with data quantum 201, such as through customer logical view 202, using dictionary 210 that may provide information about data quantum 201 and data accessibility on data quantum 201 (e.g., databases in data mesh 220 and/or data quantum 201, as well as datasets and corresponding versions and the like).

System environment 200 further includes databases 214a-g storing customer dataset versions 216a-d either in full or in part. Each of databases 214a-g have different database, query, and/or data return/retrieval statistics, requirements, SLAs, historical patterns, and the like that determine an availability, time to return or respond to queries, and/or requirement (e.g., resource usage, storage, etc.). SLAs and other requirements may also be utilized, accessed, and/or received from internal and/or external components where applicable. An SLA may indicate the required time to respond to a data request negotiated between the client device and the corresponding service provider associated with the decision service. In this regard, the SLA specifies a maximum amount of time negotiated between devices and/or servers for the required level of service that is provided. SLAs and other database requirements, stored datasets and versions, and the like may be used by data quantum users to determine whether service-level objectives (SLOs) may be met.

Dataset versions 216a-d correspond to an overall dataset used for a particular function or to store particular data that is grouped and/or selected when the dataset is created for a particular task, requirement, or data storage need. Each version of dataset versions 216a-d may be stored by one or more databases, and in further embodiments, other databases may also store these versions or other versions of the datasets. For example, for dataset version 216a (e.g., v1 of a dataset), database 214a stores that version of the dataset that enables access, retrieval, and/or operation on corresponding data. Dataset version 216b (e.g., v2 of the dataset) is stored by database 214b, dataset version 214c (e.g., v3 of the dataset) is stored in combination by database 214c and database 214d, such as each database storing a portion of the dataset, and dataset version 216d is stored in combination by database 214e and database 214g.

Customer logical view 202 and/or another component of data quantum 201 in system environment 200 may provide a data router, which may route queries for data from dataset versions 216a-d to corresponding ones of databases 214a-g. Routing may be performed based on the request, the requested data, the application performing the request, the user consumption mode of the data, and other optimizations for efficiency, speed, or data use and application requirements. In this regard, API REST calls and other API calls or requests may be structured and exchanged to return data using data quantum 201 and the corresponding router in data mesh 220 as shown in FIGS. 3A-3C and described below.

Figure 3A:
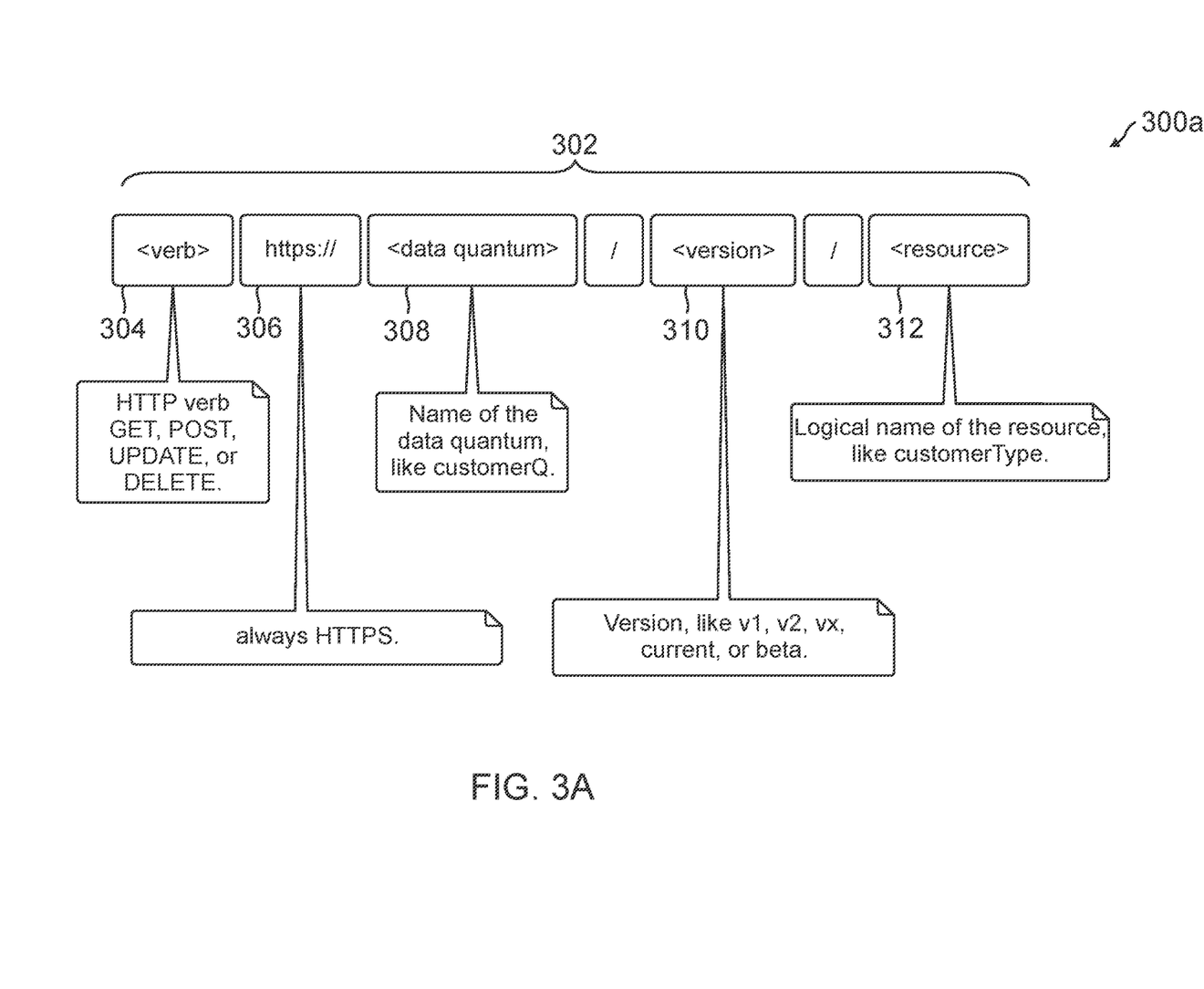
FIG. 3A is an exemplary diagram of a computing call or request for data that is processed and routed by a data request router for a data quantum of a data mesh, according to an embodiment.
Figure 3B:
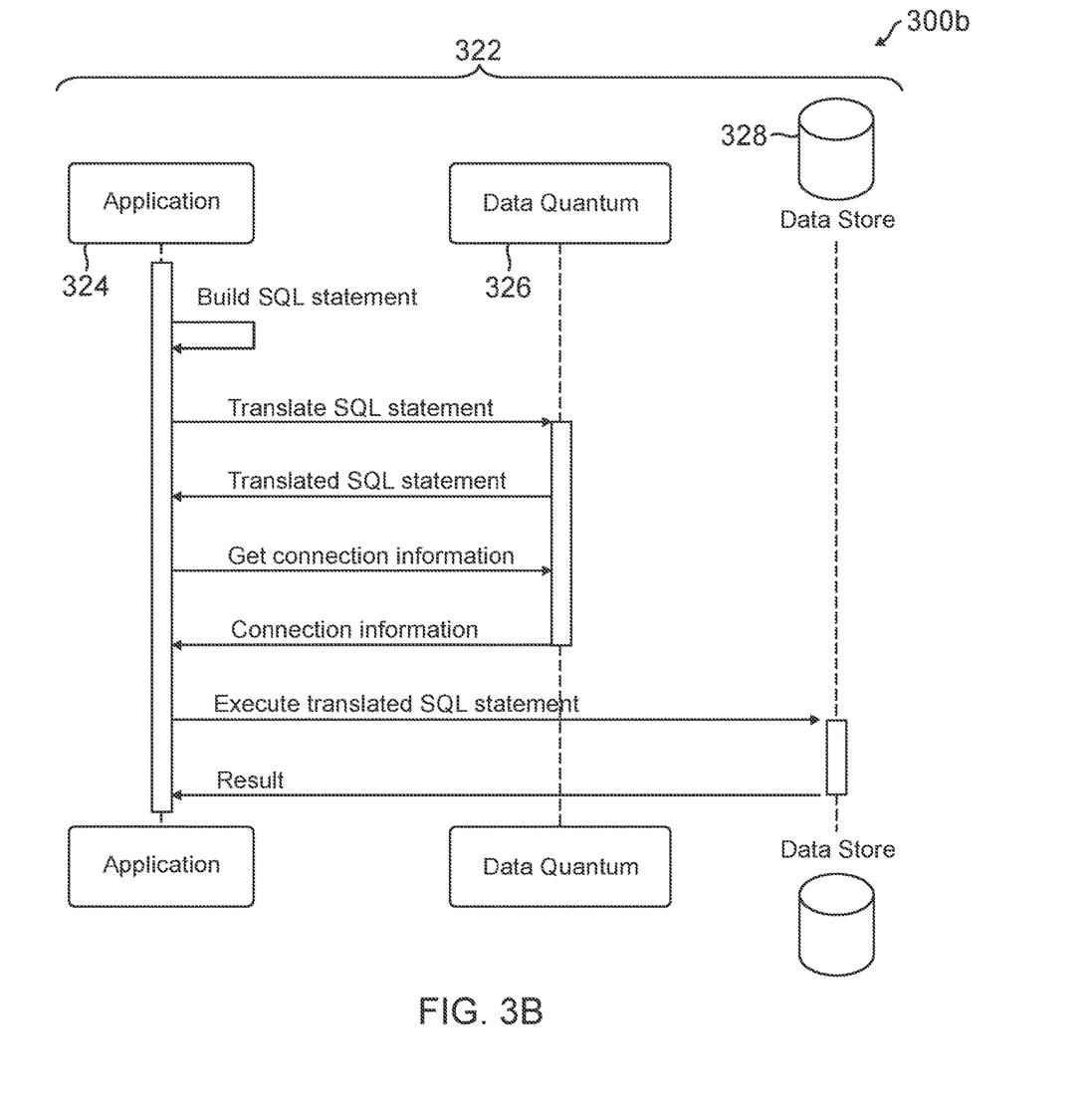
FIGS. 3B-3C are exemplary diagrams of calls executed between different components when providing dynamic data query routing between disparate data stores for datasets, according to an embodiment.
Figure 3C:
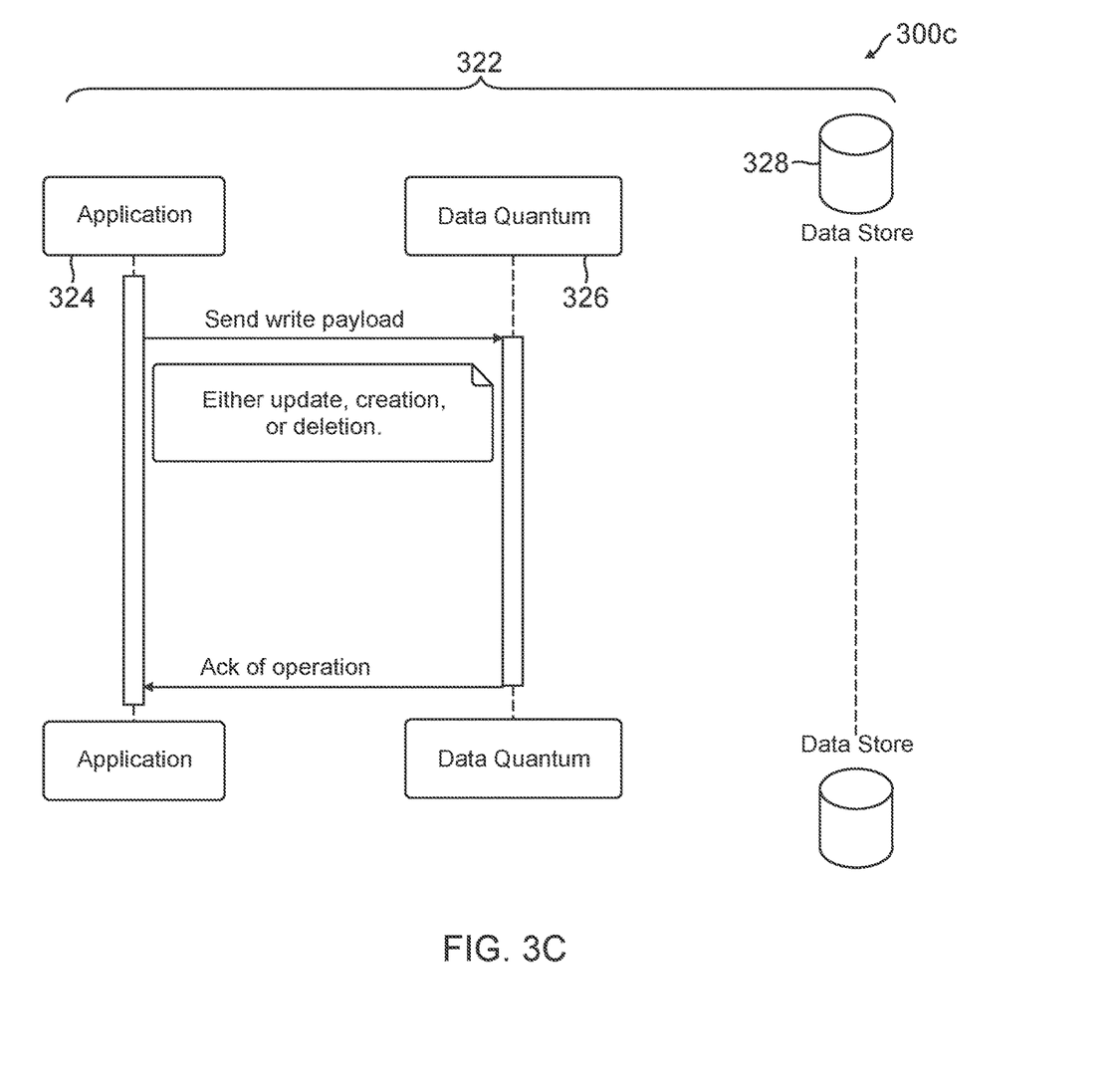

FIG. 3A is an exemplary diagram 300a of a computing call or request for data that is processed and routed by a data request router for a data quantum of a data mesh, according to an embodiment. Diagram 300a includes an API call 302, such as an API REST call or the like, that requests data from a router for a data quantum, such as router 132 discussed in reference to system 100 of FIG. 1. API call 302 in diagram 300a may identify a data quantum and abstract physical names, identifiers, or addresses of resources and databases for versions of datasets in order to allow applications to identify resources via logical names. This allows for a less strict coding requirement and/or coded link/query instructions to the version of the dataset and/or database storing a version of the database than conventionally required by utilizing physical names, identifiers, or addresses in query language and/or application code for data retrieval. Thus, API call 302 may be used to obtain the requested data from one or more additional versions, including more current versions, supported versions, beta or test versions, specific versions based on application requirements or data requirements, and the like.

In diagram 300a, API call 302 includes a verb 304, a protocol 306, a data quantum name 308, a dataset version 310, and a resource logical name 312. In this regard, verb 304 of API call 302 corresponds to an HTTP verb, such as operations or actions to execute on a resource or otherwise perform during the call. This may include POST, GET, PUT, PATCH, DELETE, UPDATE, or the like including other verbs for create, read, update, and delete (CRUD) operations. Protocol 306 may correspond to a required protocol for the API call, which generally may be HTTP or HTTPS as the communication protocol for the API call and/or data exchanges. Data quantum name 308 may correspond to the name of the correspond data quantum for the data mesh, where the quantum may be identified by a name, identifier, address, or the like (e.g., customer, customerdata, customerrequests, etc.).

Dataset version 310 may identify the queried version of a dataset, although other versions may be returned based on requirements, optimizations, and the like determined by the data router. Resource logical name 312 may provide a logical name of a resource for the version of the dataset, such as one or more databases. Dataset version 310 may be used to specify a particular dataset, however, using resource logical name 312 and other information associated with the data request for API call 302, the same version or a different version with one or more datasets may be queried for the corresponding data. Therefore, API call 302 does not require the strict entanglement of the data with the corresponding application and/or use and allows for a looser and logical data retrieval system from different datasets. Use and exchange of API call 302 between endpoints is shown via the executed calls in FIGS. 3B-3C below.

FIGS. 3B-3C are exemplary diagrams 300b and 300c of calls executed between different components when providing dynamic data query routing between disparate data stores for datasets, according to an embodiment. Diagrams 300b and 300c include examples of an application 324, a data quantum 326, and a data store 328 interacting and exchanging API calls in certain embodiments for particular operations, such as an SQL translation service sequence in diagram 300b and a sequence diagram for writing data to data quantum 326 in diagram 300c. In this regard, application 324 may correspond to application 112 of client device 110 discussed in reference to system 100 of FIG. 1, while data quantum 326 and data store 328 may be utilized and/or serviced using a data request or query router, such as data router 132 of service provider server 120 in system 100.

In this regard, diagrams 300b and/or 300c include data flows corresponding to data requests, API calls, execution flows and/or exchanged data between different decisions services. For example, the data flow may be in response to a data request from application 324 that may be provided to computing services of a service provider including those associated with data quantum 326 to retrieve data from data store 328. The data request may include an API REST call or other call, request, or the like that identifies a name or identifier of data quantum 326 in the structure of the call. Further, the data request may include a logical name of data store 328 that is recognized by application 324. Data quantum 326 may invoke a data request router in order to translate data from the call, identify data store 328 as storing a version of a dataset that allows an analytical or operational user consumption mode of the data for application 324, and return and/or operate on the data to application 324.

In diagram 300b, application 324 may build an SQL statement for a data request or query for data from a version of a dataset. Implementation of data quantum 326 may require an SQL translation of a built SQL statement that may be received from an API call, where the logical parameters and data in the SQL statement is translated to the physical parameters and data for data store 328 and the like. Application 324 may build the SQL statement using logical names or identifiers, such as of data store 328, and may provide the SQL statement to data quantum 326. Thus, application 324 interacts with data quantum 326 to translate the SQL statement using a router and corresponding table having logical names of resources and the like. Data quantum 326 may return a translated SQL statement to application 324, which may then request and receive connection information from data quantum 326. For example, the following Table 1 may be a potential output when performing a query for accessing multiple versions of a dataset based on an SQL statement:

TABLE 1

| Dataset | User Consumption Mode | Version | Status |
| --- | --- | --- | --- |
| Customer | Analytical | v1 | Supported |
| Customer | Operational | v1 | Supported |
| Customer | Analytical | v2 | Supported |
| Customer | Operational | v2 | Supported |
| Customer | Analytical | v3 | Current |
| Customer | Operational | v3 | Current |
| Customer | Analytical | v4 | Beta |
| Customer | Operational | v4 | Beta |
| CustomerByRegion | Analytical | v4 | Beta |

Since data quantum 326 knows the physical implementation and logical definition of the data via the data contract for data quantum 326, the translation service of the router may be provided internally and made available via a REST service or similar service. This then allows for data to be requested and exchanged between application 324 and data store 328. In diagram 300c, application 324 may access data via the REST API and service, as well as a direct connection to the data store. The direct connection works by translating logical SQL statements to physical SQL statements; however, such statements may only provide support for read-only access to data in certain embodiments. This may be preferable when obtaining large amounts of data. For smaller amounts of data and/or to write (e.g., create, update, or delete) data, data quantum 326 may provide the router and REST API in diagram 300c. This includes application 324 sending a write payload to data quantum 326 with an update, creation, or deletion of data in a dataset stored by data store 328. Data quantum 326 may then use the router and table to execute the SQL statement to data store 328 and receive acknowledgement of the requested operation from data store 328. This acknowledgement is provided back to application 324 from data quantum 326 instead of data store 328. Further, data quantum 326 may determine other versions of the dataset utilizing or supporting the data, and maintain data consistency by further performing the write operation using the write payload with such data versions.

Figure 4:
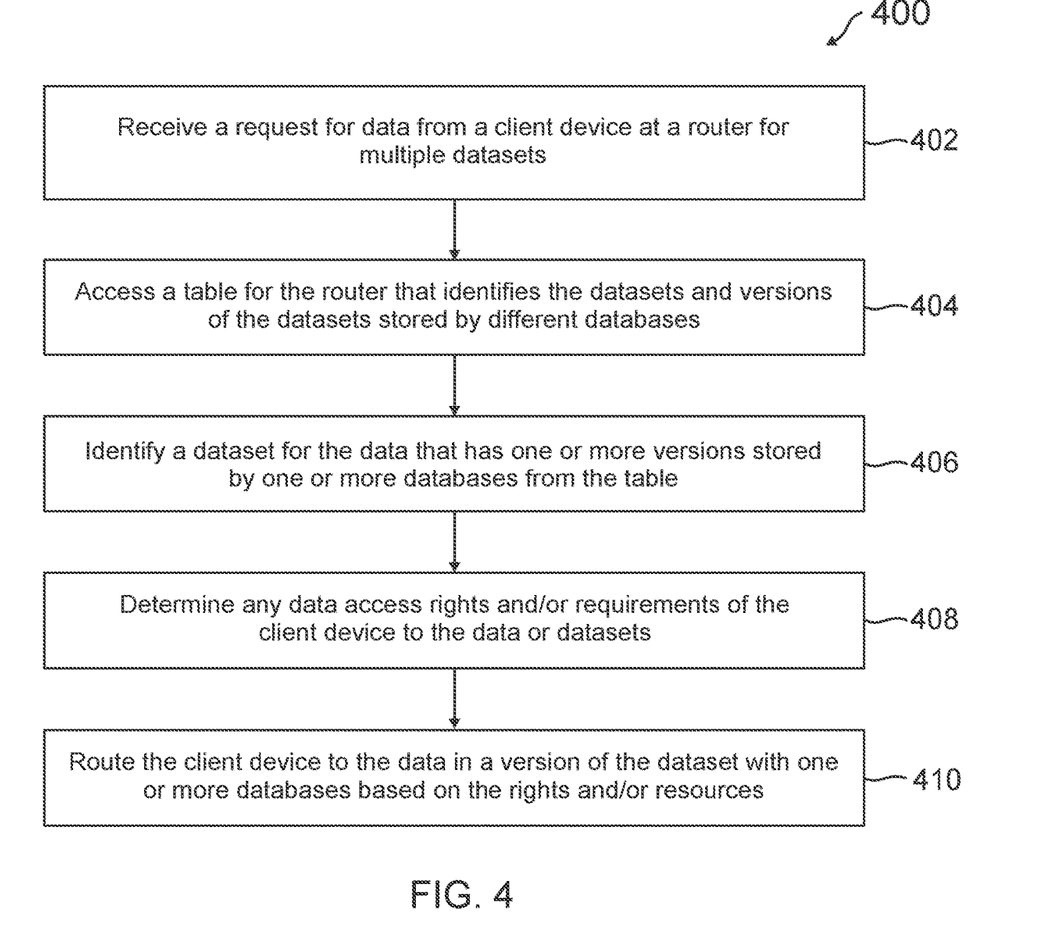
FIG. 4 is a flowchart of an exemplary process for dynamic data query routing for managing access to datasets having multiple versions, according to an embodiment.

FIG. 4 is a flowchart 400 of an exemplary process for dynamic data query routing for managing access to datasets having multiple versions, according to an embodiment. Note that one or more steps, processes, and methods described herein of flowchart 400 may be omitted, performed in a different sequence, or combined as desired or appropriate.

At step 402 of flowchart 400, a request for data from a client device is received at a router for multiple datasets. The client device may correspond to an internal or external user of a service provider, such as an employee or customer, respectively, that may request data for viewing, processing, and/or operating on in an application on the client device. The request may be structured as an API REST call or other API call or request to an API of a data quantum and/or corresponding data mesh for multiple disparate databases storing the multiple datasets. For example, the API REST call may include a structure having an HTTP verb, a protocol (e.g., HTTP Secure (HTTPS)), a name of a data quantum for the data mesh, a version of the dataset having the data, and a logical name of the resource, such as a logical name that abstracts one or more databases storing the corresponding dataset or other dataset logical identification information. The application may be coded to generate the request for the data quantum in order to locate, retrieve, read, and/or operate on the data by using logical names in place of physical names or addresses to allow for flexibility in data and/or dataset retrieval including enabling both analytical data calls and data consumption modes with operational or transactional data calls and data consumption modes.

The router may correspond to a data request and/or query router that may be capable of routing requests and queries in the data mesh to specific databases and/or versions of datasets based on requirements, needs, and optimizations for the application requesting the data. At step 404, a table for the router that identifies the datasets and versions of the datasets stored by different databases is accessed. The table may include a dataset identification or description, a user consumption mode, a version, and a status. Further, logical identifiers or names, as well as information for translation into physical names, identifiers, or addresses, may also be stored in the table. For example, an exemplary table used by the router may be seen herein in Table 1. This includes identified datasets, However, additional, less, or different data records (shown in the rows) and/or data parameters (shown in the columns) may also be used.

At step 406, a dataset for the data that has one or more versions stored by one or more databases is identified from the table. For example, an output may be determined, which may include corresponding physical databases and tables that store the dataset and corresponding data that has been requested. In some embodiments, the output may be provided to the client device requesting the data, however, this may not be necessary and instead the output used during steps 408 and 410 for identifying a corresponding version of a dataset and query/returning data from that version. At step 408, any data access rights and/or requirements of the client device to the data or datasets is determined. The data access rights may correspond to The router may include operations and intelligent decision-making, such as using rules, data, ML or other AI models, and the like, to select a version of a dataset meeting the requirements of the application requesting data from that dataset. The router may further perform any optimizations to provide more current, new, compatible, or specifically required versions of datasets for the data when selecting. The application, via the API call, may reference the resource by the logical name, and therefore the router may translate that logical name to a physical name, identifier, or address that allows for database, data store, or other resource identification and abstraction between other versions of the dataset and databases storing those versions. At step 410, the client device is routed to the data in a version of the dataset with one or more databases based on the rights and/or restrictions. This may be based on the decision and/or selection of the version of the dataset that is utilized to obtain and return data to the client device based on the request and a query to the corresponding database.

In return to the API call by the client device for the request, a result or other return may be provided to the client device, including an HTTP code (e.g., an HTTP 200 OK status, an HTTP 404 resource not found status, or other 1xx, 2xx, 3xx, 4xx, or 5xx status depending on success, redirection, client/server error, or the like). Further, the client device may operate on the data, such as by adding, deleting, updating, or otherwise changing the data. The router, with the data quantum for the data mesh, may further ensure consistency between versions of the dataset storing that operated on data. This may include proliferating and/or distributing updates across databases storing the same or other versions of the dataset so that the data stored by those databases is consistent over the data quantum.

Figure 5:
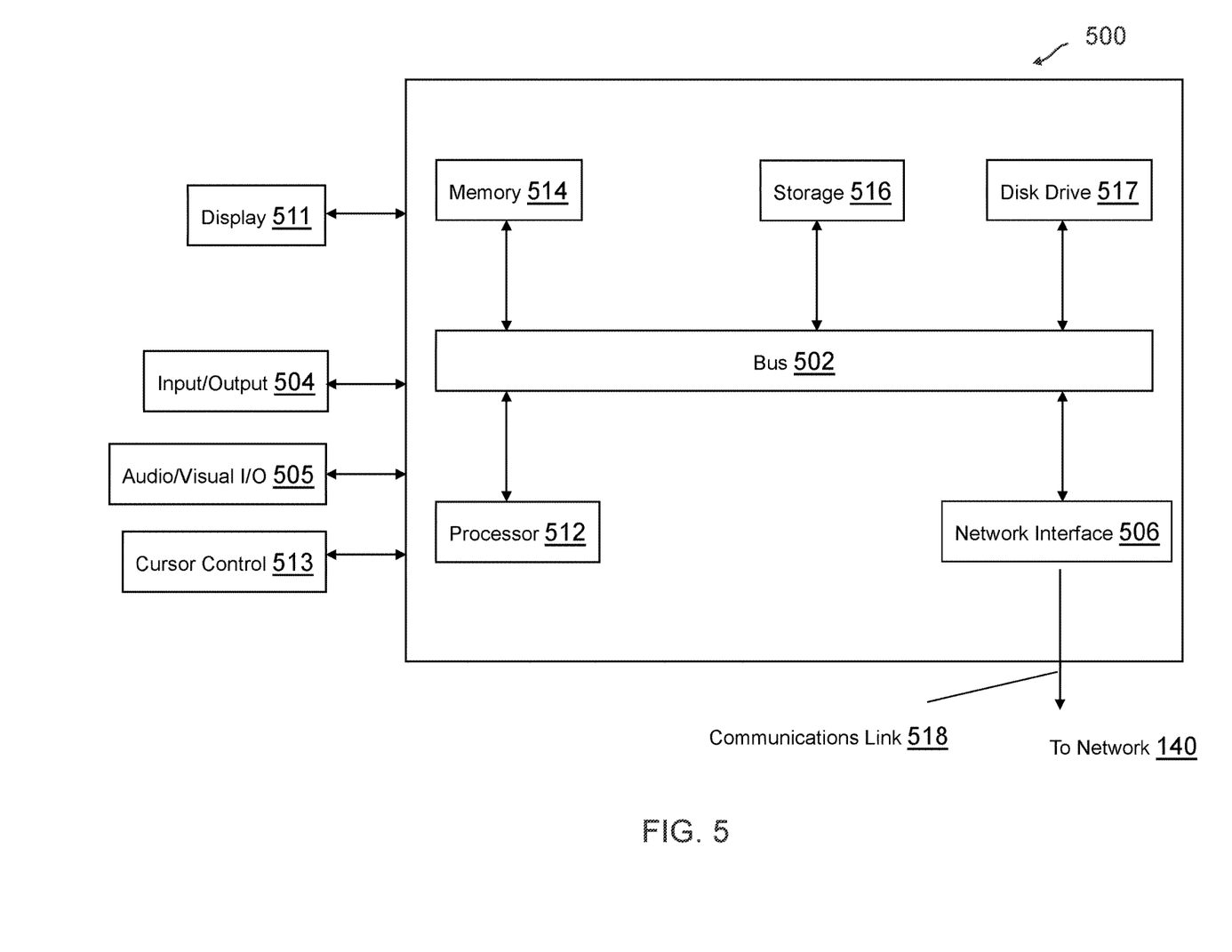
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
   receiving, from a client device at a data request router of the system, a request designated for the data request router using a first logical name of a data mesh, wherein the first logical name enables the request to be routed to the data request router on the data mesh and includes a data retrieval request for first data from a first dataset distributed over at least one of a plurality of databases of the data mesh accessible by the system, and wherein the first dataset has at least one version;
   determining, at the data request router, that the request comprises a call from an application on the client device that utilizes logical names of datasets in place of physical names that identify where the datasets are stored by the plurality of databases;
   responsive to the determining, extracting a second logical name from the request that enables the client device to identify the first dataset distributed over the at least one of the plurality of databases of the data mesh;
   translating the second logical name to at least one physical name that identifies the first dataset stored by the at least one of the plurality of databases, wherein the at least one physical name is usable to execute an application programming interface (API) call to at least one of the plurality of databases for the first dataset, wherein the translating comprises:
      determining a table for the data request router that identifies the plurality of databases storing the first dataset and a plurality of additional datasets in the data mesh and versions of each dataset stored by the plurality of databases;
      identifying, based on the table, the at least one of the plurality of databases storing the first dataset with a corresponding one or more of the at least one version of the first dataset stored by the at least one of the plurality of databases; and
      converting the second logical name to the at least one physical name for the at least one of the plurality of databases based on at least one digital address associated with the at least one of the plurality of databases;
   determining a data access right to the first data for the client device on the data mesh; and
   routing, by the data request router on the data mesh, the client device to first data in the first version of the first dataset from the at least one of the plurality of databases based on the data access right and the at least one physical address, wherein the routing is based on the API call to the at least one of the plurality of databases.

2. The system of claim 1, wherein the at least one version of the first dataset comprises the first version and a second version, wherein the first version is a more recent version than the second version, and wherein the routing comprises routing the client device to the first data in the first version over the second version of the first dataset based on at least one of the data access right or a version identification of the second version in the request for the first data.

3. The system of claim 1, wherein the data request router of the system acts as a data store for the first dataset and a plurality of second datasets from the plurality of databases, and wherein the data request router is connected with a data system encompassing a plurality of physical data stores corresponding to the plurality of databases in the data mesh.

4. The system of claim 1, wherein the table for the data request router comprises a plurality of data records each having at least one of a dataset identification, a data consumption mode identification, a dataset version, or a dataset status.

5. The system of claim 1, wherein the request for the first data comprises a database query in a language for the data request router that is compatible with the data request router identifying the first data from the plurality of databases, wherein the database query comprises a get command based on the second logical name of the first dataset, and wherein the second logical name is used in place of the at least one physical name of the first dataset.

6. The system of claim 1, wherein the operations further comprise:
   distributing, using the data request router between the plurality of databases, a change to the first data when made to the first version during operational updates and writes to the first dataset.

7. The system of claim 1, wherein the operations further comprise:
   determining, periodically, an availability of the first dataset, new versions of the first dataset, and statuses of the at least one version and the new versions the first dataset from the plurality of databases; and
   updating the table based on the determining the availability, the new versions, and the statuses.

8. The system of claim 1, wherein the at least one version of the first dataset comprises a plurality of versions each stored by a different database of the plurality of databases, and wherein one or more of the plurality of versions are able to be stored in portions by multiple databases of the plurality of databases.

9. The system of claim 1, wherein the data access right is based on one or more data usage requirements in an application on the client device that utilizes the first data, and wherein the one or more data usage requirements are associated with one of an analytical usage of the first data or an operational usage of the first data.

10. The system of claim 1, wherein prior to the receiving the request for the first data, the operations further comprise:
    executing, by the data request router, a call listener for API calls associated with data queries for data from the plurality of databases.

11. A non-transitory machine-readable medium having stored thereon machine-readable instructions executable to cause a machine to perform operations comprising:
    receiving, from a client device at a data request router, a request designated for the data request router using a first logical name of a data mesh, wherein the first logical name enables the request to be routed to the data request router on the data mesh and includes a data retrieval request to return a dataset having a version stored by at least one database of a plurality of databases of the data mesh, wherein the request includes an access right to the dataset by the client device;
    identifying, at the data request router, that the client device that utilizes logical names of datasets in place of physical names for the datasets are stored by the plurality of databases;
    responsive to the determining, extracting a second logical name from the request that enables the client device to identify the dataset distributed over the at least one of the plurality of databases of the data mesh;

translating the second logical name to at least one physical name that identifies the dataset stored by the at least one of the plurality of databases, wherein the at least one physical name is usable to execute an application programming interface (API) call to at least one of the plurality of databases for a version of the dataset, wherein the translating comprises:

accessing a database reference table comprising identifying the plurality of databases and a plurality of datasets stored by the plurality of databases, wherein each of the plurality of datasets have at least one corresponding version;

determining the version available to the client device based on the request and the access right;

identifying, based on the database reference table and the at least one physical name, a database of the plurality of databases storing the version of the dataset available to the client device; and converting the second logical name to the at least one physical name for the at least one of the plurality of databases based on at least one digital address associated with the at least one of the plurality of databases; and routing, by the data request router on the data mesh, the client device to the dataset having the version stored by the identified database, wherein the routing includes executing the API call to the database based on the at least one physical name.

12. The non-transitory machine-readable medium of claim 11, wherein the database comprises one of at least two databases that each comprise a portion of the dataset that is split in different locations for the at least two databases, and wherein the routing is performed to each of the at least two databases for the portion of the dataset.

13. The non-transitory machine-readable medium of claim 11, wherein the determining the version is further based on an application running on the client device and an application requirement of the application.

14. The non-transitory machine-readable medium of claim 13, wherein the application requirement is associated with one of data analytics in the application or data operations in the application, and wherein the application requirement comprises a request to perform one of read operations or read and write operations.

15. A method comprising:

receiving, from a client device at a data request router of a system, a request designated for the data request router using a first logical name of a data mesh, wherein the first logical name enables the request to be routed to the data request router on the data mesh and includes a data retrieval request for first data from a first dataset distributed over at least one of a plurality of databases of the data mesh accessible by the system, and wherein the first dataset has at least one version;

determining that the request is from an application utilizing logical names of datasets;

responsive to the determining, extracting a second logical name from the request that enables the client device to identify the first dataset distributed over the at least one of the plurality of databases of the data mesh;

translating the second logical name to at least one physical name that identifies the first dataset stored by the at least one of the plurality of databases, wherein the at least one physical name is usable to execute an application programming interface (API) call to at least one of the plurality of databases for the first dataset, wherein the translating comprises:

determining a table for the data request router that identifies the plurality of databases storing the first dataset and a plurality of additional datasets in the data mesh and versions of each dataset stored by the plurality of databases;

identifying, based on the table, the at least one of the plurality of databases storing the first dataset with a corresponding one or more of the at least one version of the first dataset stored by the at least one of the plurality of databases; and converting the second logical name to the at least one physical name for the at least one of the plurality of databases based on at least one digital address associated with the at least one of the plurality of databases;

determining a data access right to the first data for the client device on the data mesh;

executing the API call to the at least one of the plurality of databases; and routing, by the data request router on the data mesh based on the executing, the client device to first data in the first version of the first dataset from the at least one of the plurality of databases based on the data access right and the at least one physical address.

16. The method of claim 15, wherein the at least one version of the first dataset comprises the first version and a second version, wherein the first version is a more recent version than the second version, and wherein the routing comprises routing the client device to the first data in the first version over the second version of the first dataset based on at least one of the data access right or a version identification of the second version in the request for the first data.

17. The method of claim 15, wherein the data request router of the system acts as a data store for the first dataset and a plurality of second datasets from the plurality of databases, and wherein the data request router is connected with a data system encompassing a plurality of physical data stores corresponding to the plurality of databases in the data mesh.

18. The method of claim 15, wherein the table for the data request router comprises a plurality of data records each having at least one of a dataset identification, a data consumption mode identification, a dataset version, or a dataset status.

19. The method of claim 15, wherein the request for the first data comprises a database query in a language for the data request router that is compatible with the data request router identifying the first data from the plurality of databases, wherein the database query comprises a get command based on the second logical name of the first dataset, and wherein the second logical name is used in place of the at least one physical name of the first dataset.

20. The method of claim 15, further comprising:

distributing, using the data request router between the plurality of databases, a change to the first data when made to the first version during operational updates and writes to the first dataset.

* * * * *